United States Patent [19]

Martin et al.

[11] Patent Number: 4,965,077

[45] Date of Patent: * Oct. 23, 1990

[54] SHELF STABLE COOKIE

[75] Inventors: August J. Martin, Aurora, Colo.; Thomas E. Furia, San Jose, Calif.

[73] Assignee: Keebler Company, Elmhurst, Ill.

[*] Notice: The portion of the term of this patent subsequent to Oct. 23, 2007 has been disclaimed.

[21] Appl. No.: 27,143

[22] Filed: Mar. 16, 1987

Related U.S. Application Data

[63] Continuation of Ser. No. 518,357, Jul. 29, 1983, abandoned.

[51] Int. Cl.$^5$ .................. A21D 8/04; A21D 10/00; A21D 6/00; A23L 1/105
[52] U.S. Cl. .................................. 426/18; 426/94; 426/103; 426/549; 426/560; 426/502
[58] Field of Search ............... 426/18, 48, 94, 103, 426/549, 560, 275, 502

[56] References Cited

U.S. PATENT DOCUMENTS

| | | | |
|---|---|---|---|
| 2,801,921 | 8/1957 | Moses | 426/48 |
| 3,026,205 | 3/1962 | Stone | 426/64 |
| 3,689,280 | 9/1972 | Werner | 426/502 |
| 3,851,084 | 11/1974 | Rossen et al. | 426/502 |
| 4,344,969 | 8/1982 | Youngquist et al. | 426/18 |
| 4,455,333 | 6/1984 | Hong et al. | 426/560 |
| 4,752,484 | 6/1988 | Pflaumer et al. | 426/94 |

FOREIGN PATENT DOCUMENTS

| | | | |
|---|---|---|---|
| 0031718 | 7/1981 | European Pat. Off. | 426/560 |
| 2033135 | 1/1976 | Fed. Rep. of Germany | 426/48 |
| 2511847 | 9/1976 | Fed. Rep. of Germany | 426/549 |

OTHER PUBLICATIONS

Matz, Samuel A., *Bakery Technology and Engineering*, 2d ed., AVI Publishing Co., Westport, Conn.; ©1972, pp. 49-60 & 199-206.

Reed, *Enzymes in Food Processing*, 2d ed., Academic Press, New York, ©1975, p. 316.

Silberstein, "Enzymes in the Baking Industry," *Bakers Digest*, Dec., 1961, pp. 44-48 & 86.

Pyler, *Baking Science & Technology*, vol. 1, Siebel Publishing Co., Chicago, ©1973, pp. 121-143.

Matz et al., *Cookie and Cracker Technology*, 2d edition, AVI Publ. Co., Inc., Westport, Conn., 1968, pp. 36-38.

Baum et al., *Chemistry, A Life Science Approach*, 2d edition, Macmillan Publ. Co., Inc., New York, 1980, pp. 214-219.

Schanot, Michael A., 'Sweeteners: Functionality in Cookies and Crackers', *AIB Research Dept. Technical Bulletin*, vol. III, Issue 4, 1981, pp. 1-4.

*Primary Examiner*—Elizabeth C. Weimar
*Attorney, Agent, or Firm*—Lockwood, Alex, Fitzgibbon & Cummings

[57] ABSTRACT

A laminated dough preform, a method of forming a baked product therefrom and the baked product, includes at least two premixed dough layers containing ingredients which, when baked, result in a substantially crumb continuous laminate product over the cross section of the laminate. The first dough layer contains sucrose which readily crystallizes when the laminate is baked so as to produce a first layer having a substantially crisp texture. The second dough layer contains sucrose and also contains an enzyme active with the sucrose in the second dough layer to invert an amount of the sucrose in the second layer sufficient to substantially prevent the crystallization of the sucrose in the second dough when the dough is baked and reaches textural equilibrium such that the second baked dough layer is shelf stable and has a substantially chewy texture relative to the first dough layer. The sucrose in the second dough layer includes a substantial portion of powdered sugar and the preferred enzyme is invertase.

38 Claims, No Drawings

SHELF STABLE COOKIE

This application is a continuation of application Ser. No. 518,357, filed July 29, 1983, now abandoned.

BACKGROUND AND SUMMARY OF THE INVENTION

The present invention relates to a laminated dough preform, a method of making a baked product and the product made therefrom and, more particularly, to a laminated, crumb continuous, shelf stable cookie.

U.S. Letters Pat. No. 4,344,969 (Youngquist et al.) contains a discussion of the mechanisms which occur in crumb continuous cookies following the baking thereof and it, together with European Published Application, Ser. No. 31,718, filed Dec. 12, 1980, also contain a disclosure of a quantitative method for measuring the freshness and shelf stability of such cookies. Both the Letters Patent and published Application hypothesize that a freshly baked, crumb continuous cookie, as it leaves the oven, will have a dichotomy of textures. This is because the outer surfaces of the cookie will tend to include crystallized sugars, i.e. sucrose, which becomes crystallized due to the baking process and which imparts a generally crisp texture to the exterior surface of the cookie. Conversely, the center of such freshly baked cookies, however, will remain relatively soft and chewy, because the sucrose in the center of the cookie is still in a syrup, rather than crystalline form.

The aforementioned Letters Patent and Application further hypothesize that the reason that the freshness disappears in such freshly baked, crumb continuous cookies after a period of time is that the water in the syrups in the center of the cookie will ultimately tend to equilibrate throughout the cross-section of the cookie over a period of several days. Such equilibration results in the recrystallization of the sucrose in the cookie center and a loss of textural dichotomy over the cross-section of the cookie, even if the freshly baked cookies are stored in sealed containers.

Finally, the aforementioned Letters Patent and Application further observe that one approach which has been taken to overcome such loss of freshness is to form laminated dough structures in which a dough containing fructose or other crystallization resistant sugars is surrounded with a dough containing a typically readily crystallizable sugar. However, the Letters Patent observes that the latter approach necessitates the use of elaborate processing techniques to provide for the proper lamination of the two doughs. This is, in fact, a problem with the use of fructose containing laminates because doughs which contain sufficient amounts of fructose, fructose in combination with other sugars or high fructose corn syrup to remain chewy over extended shelf lives are generally sticky and difficult to work, handle and form, particularly in industrial processes. Moreover, it has been observed that such doughs exhibit poor crumb continuous structures and tend to collapse upon baking.

The Letters Patent says that it overcomes these disadvantage by forming a single dough mixture containing both sucrose and an enzyme. After this single dough is preformed into its cookie shape, it is first heated for a sufficient period of time and sufficient temperature to activate the enzyme in the center of the cookie, but to deactivate the enzyme in the exterior surfaces. It is then necessary to maintain this activated/deactivated product at a lower, but still elevated temperature, for a sufficient period of time to enable the activated enzyme to work upon the sucrose. After this working, the dough is finally baked to form the desired baked product which, after equilibrium is reached, is said to be crumb continuous, but retains a dichotomy of textures to simulate, after shelf storage, a freshly baked cookie.

The present invention realizes a substantial number of advantages over either the product or method which employ fructose, fructose in combination with other sugars or high fructose corn syrup to prevent loss of freshness, as well as over the single dough enzyme approach disclosed in the aforementioned Letters Patent. Moreover, proceeding in accordance with the principles of the present invention will result in a superior, crumb continuous, shelf stable product which exhibits all of the qualities of freshness which are desired in the product, as well as the quantitative physical properties as discussed in the aforementioned Letters Patent and published Application.

In the first instance, the present invention contemplates the formation of a laminate which may be baked into the final product. By forming the dough as a laminate, precise control of textural dichotomy is possible as compared to the single dough employed in the aforementioned Letters Patent. Moreover, contrary to the aforementioned single dough procedure, undue care need not be taken with respect to oven temperatures or time because selective activation and inactivation of enzymes is not relied upon in the present invention and precise control of outer crust rigidity is simplified due to the flexibility in over temperatures and baking time. Employment of laminates also enables precise control of the areas of the baked product which are influenced by the enzymes. The use of laminates also readily allows for different mixing procedures and formulations for the inner and outer layers of the product, thereby optimizing enzyme inversion rates and allowing varied sucrose and enzyme compositions and treatments, such as the use of a substantial portion of powdered sucrose in the dough containing the enzyme to increase the rate of inversion of the sucrose by the enzyme. Lamination as in the present invention also results in the ability to vary the flavoring between the interior and exterior of the product and additional ingredients, such as chocolate chips, may be restricted solely to the inner layer to reduce band smearing during the manufacture of the product. Still another advantage of using the lamination procedures of the present invention as opposed to the aforementioned single dough approach is that two different doughs of somewhat dissimilar rheological characteristics may be employed in the product facilitating versatility of the formulation and the use of differing ingredients to optimize or reduce the cost of attaining the final desired textural characteristics of the baked product.

Still another advantage of the present invention over the fructose, fructose and other sugars, or high fructose corn syrup laminates mentioned in the aforementioned Application, is that the use of such sugars or syrups may be substantially reduced or eliminated altogether in the prebaking, dough handling and forming stages along with disadvantages of sticky doughs and processing difficulties arising therefrom.

Still another advantage of the present invention over the aforementioned single dough approach is that multiple ovens and holding sequences which are necessary in the single dough approach are avoided, substantially simplifying processing and reducing the capital equipment requirements which are admittedly necessary in the single dough approach. In the present invention, enzyme activity is capable of precise time and temperature control and a separate heating step is not needed to inactivate the enzymes in the exterior or activate them in the interior of the dough. Moreover, in the present invention, the enzymes are preferably active prior to entry of the product into the oven for final baking and they are capable of working sufficiently by the time that the baking process is complete to invert in situ the amount of sucrose needed to substantially prevent recrystallization of the sucrose following baking without separate heating or holding steps. Thus, elaborate buffer and leavening agents as disclosed in the aforementioned single dough process are unnecessary. Degradation of fructose or other non-readily crystalizable sugars during the baking process and loss of taste quality are also avoided when practicing the principles of the present invention.

Still another advantage of the present invention is a superior quality of fine crumb in the inner layer of the product which is achieved through the use of a substantial portion of powdered sucrose, instead of granulated sucrose, in the inner layer. In addition to superior crumb, the powdered sucrose also substantially increases the quality of the product and the rate of inversion of the sucrose, thereby substantially eliminating the need for preheating and interim holding of the product and the additional time and capital equipment for achieving these steps.

In one principal aspect of the present invention, a laminated dough preform comprises first and second premixed dough layers containing ingredients which, when baked, result in a substantially crumb continuous laminate over its cross-section. The first premixed dough layer also contains sucrose which readily crystallizes when the laminated dough preform is baked such that the first layer has a substantially crisp texture. The second premixed dough layer contains sucrose and also an enzyme which is active with the sucrose in the second dough layer to invert an amount of said sucrose sufficient to substantially prevent the recrystallization of the sucrose in the second layer when the laminated dough preform is baked and reaches textural equilibrium such that the second layer has a shelf stable, substantially chewy texture relative to the first layer.

In another principal aspect of the present invention, a premixed dough preform contains sucrose, a substantial portion of which is powdered. The dough also contains an enzyme which is active with the sucrose to invert an amount of the sucrose sufficient to substantially prevent the recrystallization of the sucrose when the dough is baked and reaches equilibrium such that the dough, when baked, has a shelf stable, substantially chewy texture.

In still another principal aspect of the present invention, a method of making a sweetened product comprises premixing of first and second doughs. The premixed first dough contains sucrose which readily crystallizes when the first dough is baked so as to produce a substantially crisp texture. The premixed second dough is capable of forming a crumb continuous laminate with the first dough over the cross-section of the laminate when the laminate is baked. The second dough includes sucrose and also contains an enzyme which is active with the sucrose in the second dough to invert an amount of the sucrose which is sufficient to substantially prevent the recrystallization of the sucrose in the second dough when the second dough is baked and reaches textural equilibrium so as to produce a substantially chewy, shelf stable texture. The first and second doughs are applied to each other to form a laminated dough structure thereof.

In still another principal aspect of the present invention, a baked product is formed by baking the aforementioned laminated dough structure.

In still another principal aspect of the present invention, the aforementioned enzyme is invertase.

In still another principal aspect of the present invention, the sucrose in the dough which contains the enzyme includes a substantial portion of which is powdered sucrose.

These and other objects, features and advantages of the present invention will become evident upon consideration of the following detailed description.

DETAILED DESCRIPTION OF THE PREFERRED EMBODIMENTS

In the preferred embodiments of the present invention two or more premixed dough layers are formed and laminated together.

One of the layers is formulated of typical dough ingredients, such as by way of example, typical cookie dough ingredients suitably containing flours, eggs or other binders, shortening, flavoring ingredients, water (in either syrup form or as directly added) and a substantial amount of sugar. In this first layer, the sugar preferably takes the form of granulated sucrose which, when the dough is baked, readily crystallizes to impart a substantially crisp texture to the dough.

The second layer may be formed of substantially similar ingredients with the exceptions to be noted to follow, or may contain one or more substantially dissimilar ingredients than those in the first layer. An example of the former may be oatmeal cookies in which oatmeal is contained in both the first and second layers. An example of the latter may be a peanut butter cup type cookie in which one layer contains substantial amounts of chocolate and the other layer substantial amounts of peanut butter. Another example of the latter may be a chocolate chip cookie in which chocolate chips are contained in only one of the layers, such as the second layer. What is important, however, is that whatever ingredients are in the first and second layers, they should be substantially crumb continuous following baking.

The second layer also contains sucrose. However, in accordance with the present invention, a sufficient amount of enzyme of a kind which is active with sucrose, such as invertase, is also included in the second layer. The amount of enzyme in the second layer should be sufficient to invert in situ an amount of the sucrose in the second layer to prevent the crystallization of the sucrose in the second layer when the dough is baked and then reaches textural equilibrium so that the second layer will exhibit a shelf stable, substantially chewy texture relative to the first layer. In order to prevent such crystallization, at least 15% of the sucrose should be inverted to invert sugar, i.e. a mixture of fructose and glucose, and more preferably 50% or more should be inverted. Invertase having an activity of about 3000–200000 Sumner units/g and in an amount of about 0.1–10 wt % of the dough in the second layer is sufficient for this purpose.

In the context of the present invention, textural equilibrium is that state which is reached after baking, cooling and shelf storage, in a sealed condition, for several days after which further textural changes become nominal. Shelf stability is the condition in which the product is capable of maintaining a soft chewy texture after equilibrium is reached for at least three weeks and, preferably, several months to a year.

In the preferred embodiment of the present invention, a substantial portion of the sucrose in the second dough layer is preferably powdered sucrose and is preferably finely powdered sucrose on the order of 6X. It has been discovered that the use of powdered sucrose, such as confectioner's sugar, in this dough substantially improves the texture of this dough layer when baked. The powdered sucrose improves this layer by reducing the graininess or granularity of this dough layer. Such graininess might be present due to incomplete dissolving of the sucrose in the layer during the baking process, which might leave a substantial number of crystals of granulated sucrose in this second layer of the finished baked product.

Another important advantage of the powdered sucrose in the present invention is that the inversion rate of the enzyme is substantially increased. This appears to be due to the fact that not only may the enzyme and powdered sucrose be intimately mixed before introduction to the second dough to insure uniform reactivity in the dough, but the small size of the powdered sucrose grains also substantially increases the rate of action of the enzyme on the powdered sucrose, thereby substantially reducing the time and temperature necessary to effect the desired degree of in situ inversion of the sucrose during baking and a reduction in the amount of enzyme needed to effect the desired degree of inversion. Indeed, it has been discovered that by utilizing powdered sucrose in the second dough, the degree of inversion of the powdered sucrose necessary to produce a high quality, shelf stable, chewy texture in the dough may be accomplished simply within the dough mixing and baking stages without the need for holding stages and stepped heating and baking operations and the attendant extra equipment necessary therefor as in the prior art. By way of example, the desired in situ inversion can occur within the combined mixing and prebake time, which is typically 10-30 minutes at ambient temperatures, and 5-8 minutes of baking time.

The preferred ratio of powdered sucrose to granulated sucrose is on the order of approximately 50:50. The powdered sucrose may be present in amounts of between about 16-55 wt % of the dough. When the amount of powdered sucrose is increased, an even softer center with an even longer shelf life results. Lower percentages of powdered sucrose will result in lower inversion rates of the enzyme and increased graininess of the second dough layer after baking.

In the preferred form of the present invention, the second dough is preferably formed as a layer in a laminate with an upper and lower layer of the first dough to realize the advantages of such laminates as previously described. After the dough is laminated, for example, by sheeting the several dough layers upon each other or by extruding the second dough simultaneously with an outer covering of the first dough, the laminated dough product may be cut into its desired cookie shapes and the edges pinched so as to completely enclose the second dough layer. At this point in time, the preferred weight ratio in the laminate of the first dough to the second dough is approximately 35:65. It will be understood, however, that such weight ratio may be reasonably varied depending upon the nature of the final product which is desired.

Baking of the laminate preform may be at conventional temperatures and times. As the temperature of the second dough becomes elevated during baking, the inversion rate of the enzyme with respect to the sucrose in the second dough will substantially increase. Indeed, at somewhat elevated temperatures, such inversion rates will be extremely high due to the presence of the substantial portion of the sucrose being in a powdered form so that, toward the end of the bake, sufficient amounts of the sucrose will have been inverted in situ to substantially prevent recrystallization of the remainder of the sucrose in the second layer once baking has been completed.

Baking is preferably continued for a sufficient time and temperature to ultimately raise the second dough to a temperature which will deactivate the enzyme in the final product, the enzymes being heat labile.

Although it is believed that the present invention will be fully appreciated after considering the foregoing description, examples of preferred embodiments of the invention follow:

EXAMPLE 1
Inner Second Dough

| Ingredients | Wt. % |
| --- | --- |
| Sucrose, powdered (6X or 100-200 mesh) | 15.4 |
| Enzyme (Sucrovert IX, Ingredient Technology Approx. 3000 Sumner units/g) | 8.9 |
| Sucrose, granulated | 14.4 |
| Margarine | 12.8 |
| Flour | 22.9 |
| Molasses | 3.6 |
| Salt | 0.5 |
| Starch (Instant Pure Flow F, National Starch Co.) | 1.6 |
| Whole Eggs | 1.8 |
| Chocolate chips | 18.1 |

The total wt. % of sucrose in the dough was, therefore, 29.8 wt. % of which 15.4 wt. % (or 51.5% of the sucrose) was powdered sucrose and 14.4 wt. % (or 45.5% of the sucrose) was granulated sucrose.

The powdered sucrose and the enzyme are first blended by mixing for 1 minute at speed 2 on a Hobart mixer, Model No. N-50.

The granulated sucrose is then added to the last mentioned mixture and mixing is continued for 1 minute at speed 2 of the mixer.

The margarine is then added to the last mentioned mixture and is mixed for 3 minutes on speed 3 of the mixer.

The flour, molasses, salt, starch and whole eggs are next added to the last mentioned mixture and are mixed first for a ½ minute on speed 1, and then for another 1½ minutes on speed 2 of the mixer.

Finally, the chocolate chips are mixed into the last mentioned mixture by hand until they are uniformly blended in the inner dough.

The final dough temperature is approximately 21.5° C.

First Dough

| Ingredients | Wt. % |
| --- | --- |
| Margarine | 19.9 |
| Molasses | 3.6 |

-continued

| First Dough | |
|---|---|
| Ingredients | Wt. % |
| Sucrose, granulated | 33.4 |
| Lecithin | 0.1 |
| Whole Eggs | 5.0 |
| Flour | 36.7 |
| Soda | 0.4 |
| Salt | 0.5 |
| Vanilla | 0.4 |

The margarine, molasses, granulated sucrose and lecithin are added together and mixed for 2 minutes on speed 2 of the aforementioned Hobart mixer.

The eggs are added to this last mentioned mixture and mixed for an additional 2 minutes on speed 2.

Finally, the flour, soda, salt and vanilla are added to the last mentioned mixture and first mixed for ½ minute on speed 1, and then for an additional 1½ minutes on speed 2.

The final temperature of the dough at completion of mixing is approximately 22.3° C.

EXAMPLE 2

The same doughs were prepared as in Example 1, except that the inner second dough has only 25.9 wt. % of sucrose of which the powdered sucrose constitutes only 16.9% of the total sucrose and the granulated sucrose 83.1% of the total sucrose.

EXAMPLE 3

The same doughs were prepared as in Example 1, except that the inner dough has 29.8 wt. % sucrose of which 100% is granulated sucrose and does not include any powdered sucrose.

EXAMPLE 4

The inner second dough, as set forth in Example 1, is formed into a single sheet of between 0.2–0.4 inch thickness by rolling by hand. The outer first dough, as set forth in Example 1, is also formed into a sheet of approximately 0.039–0.045 inch thickness also by rolling by hand.

Circular discs are cut from the inner second dough sheet having a diameter of approximately 1.3 inches and weighing about 7.5 grams.

Two sets of circular discs are also cut from the outer first dough sheet. One set of discs have a diameter of approximately 2.0 inches and a weight of about 2.5 grams. The other set of discs have a diameter of approximately 1.54 inches and are about 2.0 grams in weight. Thus, when these discs are combined with an inner second dough disc, the weight ratio of outer dough to inner dough is about 38:62.

A number of laminated dough preforms are formed by applying the discs to each other. One of the inner second dough discs is superimposed upon the last mentioned outer first dough disc and the first mentioned outer first dough disc is superimposed upon the inner second dough disc to form a three layer laminate. Each of these laminate preforms are then flattened gently by hand and the edges are pinched to seal the inner second dough discs between the outer first dough discs.

Each of the laminated dough preforms is then placed upon a baking band at 80° F. and is baked in an oven at 350° F. for eight minutes.

Following baking, the baked laminated product samples are fan cooled until their structure is rigid and then are freezer cooled for five minutes. Following baking and before cooling, the interior temperature of the inner second dough of the laminate ranges between 192° F. and 230° F. The inner second dough exhibits an excellent, soft, fine structure which is crumb continuous with the outer dough layers.

EXAMPLE 5

The procedure outlined in Example 4 is repeated, but using the inner second dough formulation as set forth in Example 2 in which the percentage of powdered sucrose is lower than in Example 1. The inner second dough exhibits a soft structure having relatively large cells and which is gummy, but crumb continuous with the outer first dough layers. The product was acceptable in these respects.

EXAMPLE 6

The procedure outlined in Example 4 is again repeated, but using the inner second dough formulation containing 100% granulated sugar as set forth in Example 3. The inner second dough exhibits a generally unacceptable hard, syrupy appearance, but was crumb continuous with the outer first dough layers.

EXAMPLE 7

After cooling as set forth in Examples 4–6, each of the baked product samples are sealed in glass containers which are flushed with nitrogen. Stiffness and plasticity readings are then taken on various ones of the samples over a period of time. Such readings are taken and the difference between the maximum and minimum log of stiffness/plasticity is calculated, all as set forth in the aforementioned Letters Patent and the Published Application. At varying time intervals the samples are removed from their respective containers and the aforementioned tests are conducted. The difference between the maximum and minimum log of stiffness/plasticity are as follows:

| Days After Bake | Examples 1 & 4 | Examples 2 & 5 | Examples 3 & 6 |
|---|---|---|---|
| 1 | 2.78 | — | — |
| 7 | 2.16 | — | — |
| 14 | 3.74 | — | — |
| 29 | — | 1.70 | — |
| 36 | 2.87 | — | — |
| 39 | — | — | 3.79 |

It will be understood that the embodiments of the invention which have been described are merely illustrative of a few of the applications of the principles of the present invention. Numerous modifications may be made by those skilled in the art without departing from the true spirit and scope of the invention.

We claim:

1. A laminated dough preform comprising:

first and second unbaked premixed dough layers containing dough ingredients including sucrose which, when baked, result in a substantially crumb continuous laminate over its cross section;

said ingredients in said first premixed dough layer permitting said sucrose in said layer to readily crystallize when the laminated dough preform is baked such that said ingredients in said first layer produce a substantially crisp texture; and said second premixed dough layer also containing an enzyme which is active upon at least one of said dough ingredients in said second dough layer to produce in situ a sugar product in said second layer from said dough ingredient at least by completion of bake which is sufficient to substantially prevent the recrystallization of the sucrose in said second layer when said laminated dough preform is baked and reaches textural equilibrium such that said second layer has a shelf stable, substantially chewy texture relative to said first layer.

2. The laminated dough preform of claim 1, wherein said enzyme is invertase.

3. The laminated dough preform of claim 1, wherein a substantial portion of said sucrose in said second layer comprises powdered sucrose.

4. The laminated dough preform of claim 3, wherein said powdered sucrose is 6X.

5. The laminated dough preform of claim 3, wherein said powdered sucrose comprises about 16-55 wt. % of said second dough layer.

6. The laminated dough preform of claim 3, wherein said enzyme is invertase.

7. The laminated dough preform of claim 6, wherein said invertase comprises about 0.1-10 wt. % of said second dough layer and has an activity of about 3000-200000 Sumner units/g.

8. The laminated dough preform of claim 6, wherein said dough is cookie dough.

9. The laminated dough preform of claim 1, wherein said dough is cookie dough.

10. A premixed dough preform, said dough containing dough ingredients including sucrose, a substantial portion of which is powdered, and an enzyme which is active upon at least one of said dough ingredients to produce in situ a sugar product in said dough from said ingredient at least by completion of bake which is sufficient to substantially prevent the recrystallization of the sucrose when the dough is baked and reaches equilibrium such that said dough, when baked, has a shelf stable, substantially chewy texture.

11. The premixed dough preform of claim 10, wherein said enzyme is invertase.

12. The premixed dough preform of claim 11, wherein said invertase comprises about 0.1-10 wt. % of said dough and has an activity of about 3000-200000 Sumner units/g.

13. The premixed dough preform of claim 10, wherein said powdered sucrose is 6X.

14. The premixed dough preform of claim 10, wherein said powdered sucrose comprises about 16-55 wt. % of said dough.

15. The premixed dough preform of claim 13, wherein said dough is cookie dough.

16. The premixed dough preform of claim 10, wherein said dough is cookie dough.

17. A method of making a sweetened product comprising the steps of:
premixing a first dough containing dough ingredients, including sucrose which readily crystallizes when the first dough is baked so that said dough ingredients produce a substantially crisp texture;
premixing a second dough which is capable of forming a crumb continuous laminate over its cross section when laminated to and baked with said first dough, said second dough containing dough ingredients including sucrose, and also containing an enzyme which acts upon at least one of said ingredients in said second dough to produce a sugar product in situ in that dough from said ingredient at least by completion of bake which is sufficient to substantially prevent the recrystallization of the sucrose in said second dough when said second dough is baked and reaches textural equilibrium so as to produce a substantially chewy shelf stable texture; and
applying said first and second doughs to each other to form a laminated dough structure thereof before baking.

18. The method of claim 17, including forming a laminated, crumb continuous baked product by baking said laminated dough structure.

19. The method of claim 18, wherein said baking is for a sufficient time and at a sufficient temperature to substantially inactivate said enzyme.

20. The method of claim 17, wherein said enzyme is invertase.

21. The method of claim 20, wherein said invertase comprises about 0.1-10 wt. % of said second dough and has an activity of about 3000-200000 Sumner units/g.

22. The method of claim 18, wherein said enzyme is invertase.

23. The method of claim 19, wherein said enzyme is invertase.

24. The method of claim 17, wherein a substantial portion of the sucrose in said second dough is powdered sucrose.

25. The method of claim 24, wherein said powdered sucrose comprises about 16-55 wt. % of said second dough.

26. The method of claim 18, wherein a substantial portion of the sucrose in said second dough is powdered sucrose.

27. The method of claim 19, wherein a substantial portion of the sucrose in said second dough is powdered sucrose.

28. The method of claim 27, wherein said powdered sucrose is 6X.

29. The method of claim 27, wherein said enzyme is invertase.

30. A baked product baked from the premixed dough preform of claim 10.

31. A baked product from the premixed dough preform of claim 12.

32. A baked product baked from the premixed dough preform of claim 14.

33. The method of claim 17, including the step of commencing the action of said enzyme on said ingredient before baking is commenced.

34. The method of claim 33, wherein the action of said enzyme is commenced during said premixing of said second dough.

35. The method of claim 20, including the step of commencing the action of said invertase on said sucrose before baking is commenced.

36. The method of claim 35, wherein the action of said invertase is commenced during said premixing of said second dough.

37. The method of claim 24, wherein said enzyme is invertase and the action of said invertase is commenced on said sucrose before baking is commenced.

38. The method of claim 37, wherein the action of said invertase is commenced during said premixing of said second dough.

* * * * *

UNITED STATES PATENT AND TRADEMARK OFFICE
CERTIFICATE OF CORRECTION

PATENT NO. : 4,965,077

DATED : October 23, 1990

INVENTOR(S) : August J. Martin and Thomas E. Furia

It is certified that error appears in the above-identified patent and that said Letters Patent is hereby corrected as shown below:

In column 6, line 65, before "First" insert -- Outer --.

In column 9, line 59, claim 17, delete "so" and insert -- such --.

Signed and Sealed this

Thirty-first Day of March, 1992

Attest:

HARRY F. MANBECK, JR.

*Attesting Officer*  *Commissioner of Patents and Trademarks*